United States Patent [19]

Protheroe et al.

[11] Patent Number: 5,191,175
[45] Date of Patent: Mar. 2, 1993

[54] SELF-TUNING DIGITIZER CONTROL CIRCUIT AND METHOD

[75] Inventors: Robert L. Protheroe; Kazem Memarzadeh; John F. Crooks, all of Cambridge, Ohio

[73] Assignee: NCR Corporation, Dayton, Ohio

[21] Appl. No.: 737,129

[22] Filed: Jul. 29, 1991

[51] Int. Cl.⁵ .............................................. G08C 21/00
[52] U.S. Cl. ......................................... 178/18; 178/19
[58] Field of Search ..................................... 178/19, 18

[56] References Cited

U.S. PATENT DOCUMENTS

| | | | |
|---|---|---|---|
| 4,264,903 | 4/1981 | Bigelow | 178/19 |
| 4,650,296 | 3/1987 | Nakamura et al. | 178/18 |
| 4,698,461 | 10/1987 | Meadows et al. | 178/19 |
| 4,853,493 | 8/1989 | Schlosser et al. | 178/18 |

Primary Examiner—Stafford D. Schreyer
Attorney, Agent, or Firm—Paul W. Martin

[57] ABSTRACT

A self-tuning digitizer control circuit and method which employs a tunable excitation source instead of a tunable front end. In addition, the digitizer control circuit includes a stylus for sensing the excitation signal, and a circuit for processing the information signal from the stylus, including a narrow bandpass filter for passing the frequency of the excitation signal and minimizing the passage of extraneous noise. A controller determines the location of the stylus on the active surface of the digitizer and control operation of the circuit. The excitation source includes, in the preferred embodiment, a tunable divide-by-n circuit employing an 8-bit latch, an 8-bit counter, and a state machine. A nonvolatile memory stores the most recent value for the divisor value n. Provision is also made for a tuning method for the divide-by-n circuit.

31 Claims, 6 Drawing Sheets

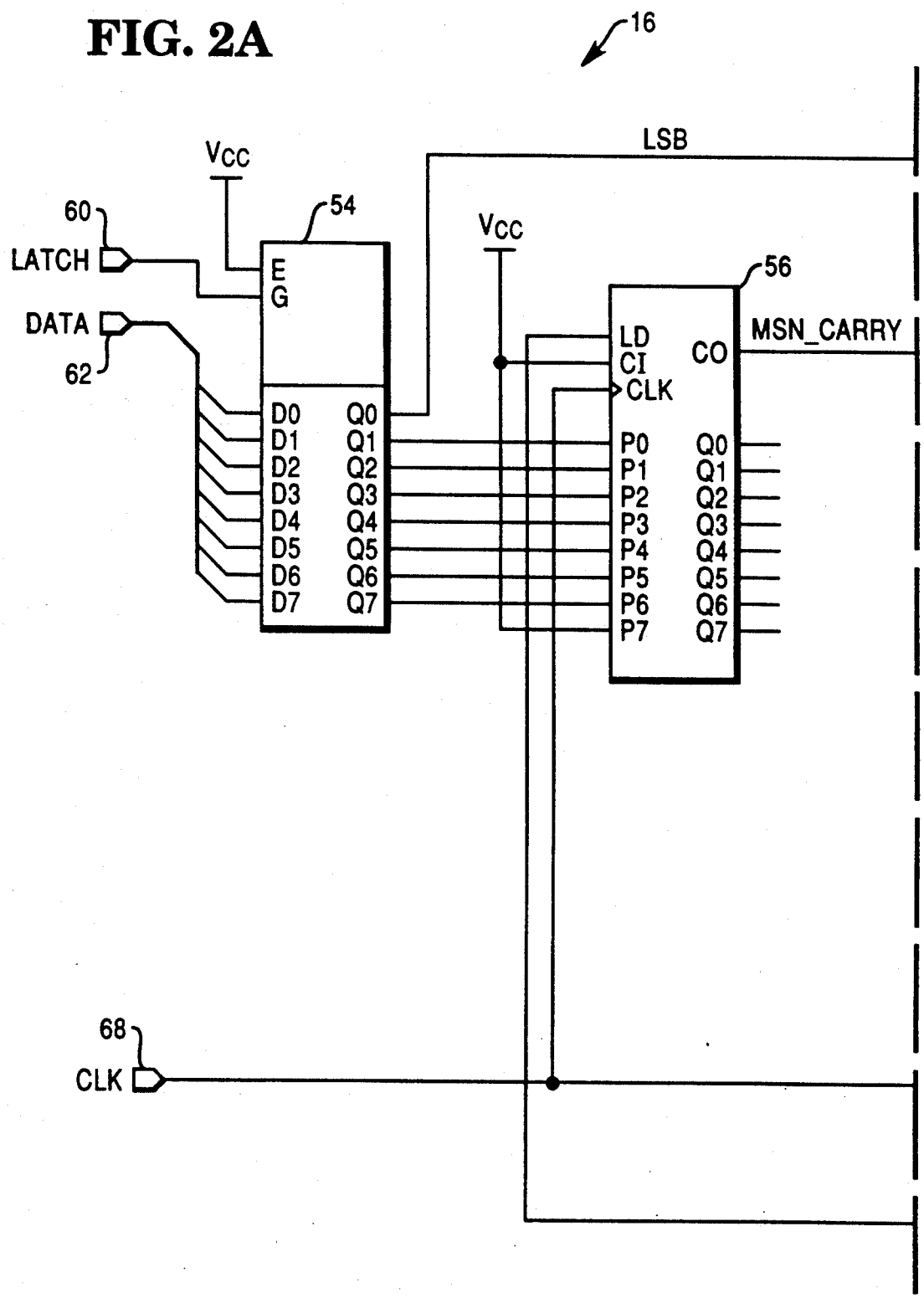

SELF-TUNING DIGITIZER CONTROL CIRCUIT AND METHOD

BACKGROUND OF THE INVENTION

The present invention relates to devices for capturing positional inputs and more specifically to a self-tuning digitizer control circuit.

In general, there are several types of digitizers, including electrostatic and capacitive digitizers. Electrostatic digitizers operate in response to one or more periodic excitation sources selectively energizing a conductive coated substrate. The stylus is coupled to the energized conductive coating. The signal from the stylus is then filtered, processed, and measured to determine the position of the stylus on the substrate. The electrostatic digitizer takes its name from the electrostatic coupling that takes place between the stylus and the conductive coating.

Alternatively, electrostatic digitizers also operate in response to one or more periodic excitation sources energizing the conductive stylus. The stylus is coupled to a conductive coated substrate. Signals from the conductive coating are filtered, processed, and measured to determine the position of the stylus on the substrate.

U.S. Pat. No. 4,853,493 to Schlosser et al., entitled, "Electrographic Apparatus", issued Aug. 1, 1989, discloses an electrostatic digitizer.

Capacitive digitizers operate in response to a periodic excitation source selectively energizing a conductively coated substrate. A conductive stylus (often a finger) with a finite impedance to ground is coupled to the energized conductive coating. The currents required by the excitation source to selectively energize the conductive coating are filtered, processed, and measured to determine the position of the stylus on the substrate.

Filtering and processing is performed by a "front end" section. Both types of digitizers rely on a filter in the front end section for filtering signals related in frequency to the excitation or drive source (or sources) to determine stylus position. The filter must be selective enough to reject unwanted electrical noise which tends to degrade the accuracy of stylus position data. For optimal operation, the filter frequency characteristic must accurately match that of the periodic excitation source. The usual way for accomplishing this match is to tune the filter frequency characteristic to that of the excitation frequency.

Unfortunately, the more selective the filter, the more its frequency characteristic becomes dependent upon the tolerances of the components used to build the filter. The filter frequency characteristic must accurately match that of the periodic excitation source for optimal operation. The usual way of accomplishing this match is to tune the filter frequency characteristic to that of the excitation frequency.

The filter is usually a narrow bandpass filter. The bandwidth must pass the excitation frequency, yet be narrow enough to minimize passage of electrical noise. Unfortunately, the narrower the bandwidth, the more critical it is to match the center frequency to the excitation frequency. Bandpass filters having a predictably stable center frequency are difficult to design because component tolerances tend to detune the center frequency. Widening bandwidth makes the center frequency less critical, but performance suffers due to electrical noise. Using high precision parts adds significant cost. Also, component value drift over time compromises performance. Manually tuning the filter to the excitation frequency adds cost; variable inductors and capacitors are more expensive than non-tunable components and require costly periodic adjustment. Component value drift over time compromises performance.

Therefore, it would be desirable to provide a cost-effective digitizer control circuit which is self-tuning, that is, a digitizer control circuit which controls and automatically retunes the excitation source to match the center frequency of a narrow bandpass filter constructed of relatively low-precision, fixed value components during the life of the digitizer.

SUMMARY OF THE INVENTION

In accordance with the teachings of the present invention, a self-tuning digitizer control circuit is provided. The self-tuning digitizer control circuit includes a circuit for exciting the active surface of the digitizer, a stylus for sensing the excitation signal, and circuitry for processing the information signal from the stylus, including a narrow bandpass filter for passing the frequency of the excitation signal and minimizing the passage of extraneous noise, a preamplifier between the stylus and the bandpass filter, an AC-to-DC converter coupled to the output of the bandpass filter, and an analog-to-digital converter coupled to the AC-to-DC converter.

A controller determines the location of the stylus on the active surface of the digitizer and controls operation of the circuit.

The excitation source includes a drive frequency generator coupled to the controller, a system clock for driving the drive frequency generator, an optional second bandpass filter coupled to the drive frequency generator, and a screen driver for selectively exciting the digitizer. In the preferred embodiment, the drive frequency generator is a tunable divide-by-n circuit employing an 8-bit latch, an 8-bit counter, and a state machine. A nonvolatile memory stores the most recent value for the divisor value n.

A switch controlled by the controller periodically grounds the stylus to measure DC signal offset. Provision is also made for a second switch for joining the output of the optional bandpass filter with the stylus output before filtering by the narrow bandpass filter. A tuning method is disclosed which yields an optimum value for divisor value n.

It is a feature of the present invention that the excitation frequency is tuned to the front end, instead of the front end being tuned to the excitation frequency.

It is accordingly an object of the present invention to provide a self-tuning digitizer control circuit.

It is another object of the present invention to provide a self-tuning digitizer control circuit which includes a tunable excitation or drive source.

It is another object of the present invention to provide a self-tuning digitizer control circuit which does not include a tunable filter in the front end.

It is another object of the present invention to provide a self-tuning digitizer control circuit which includes a bandpass filter constructed of inexpensive, relatively low-precision, fixed-value components.

It is another object of the present invention to provide a self-tuning digitizer control circuit which can be automatically retuned at any time to compensate for component drift.

It is another object of the present invention to provide a novel drive frequency source.

It is another object of the present invention to provide a novel drive frequency source which is an adjustable divide-by-n circuit.

It is another object of the present invention to provide an adjustable divide-by-n circuit which derives the minimum frequency step per count of n for a given system frequency.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2A is a circuit diagram of the drive frequency generator of the present invention;

DETAILED DESCRIPTION OF THE PREFERRED EMBODIMENT

Figure 1:
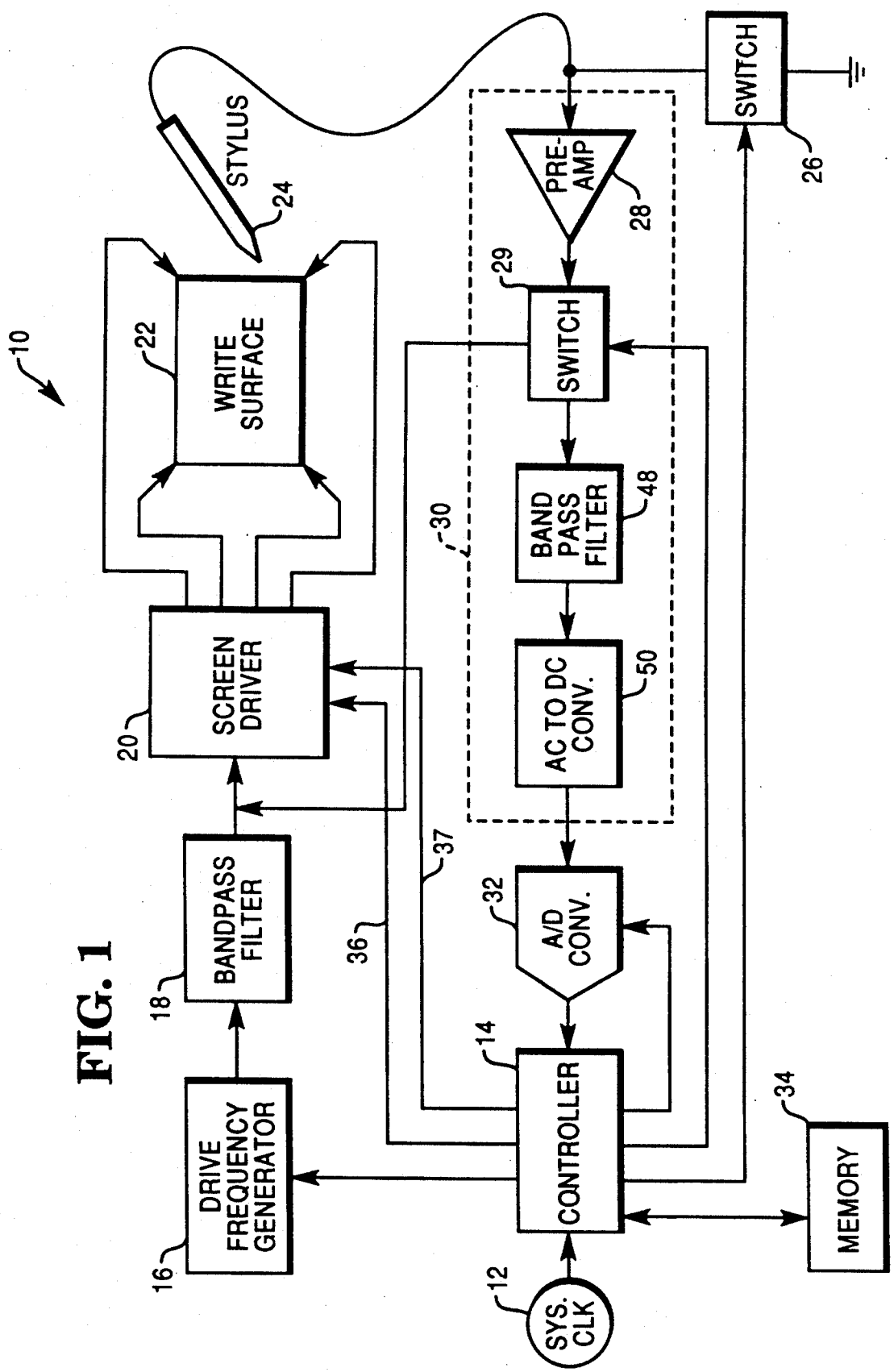
FIG. 1 is a block diagram of the self-tuning digitizer control circuit of the present invention.

Turning now to FIG. 1, digitizer control circuit 10 of the present invention includes system clock 12, controller 14, drive frequency generator 16, bandpass filter 18, screen driver 20, write surface 22, stylus 24, stylus grounding switch 26, front end 30, analog-to-digital (A/D) converter 32, and memory 34.

Controller 14 is a commercially available microcontroller. In the preferred embodiment, the Intel 80196 microcontroller is used.

System clock 12 generates a square wave signal at 11.0592 MHz, and drives controller 14. In the preferred embodiment, system clock 12 also drives drive frequency generator 16. Preferably, system clock 12 is an onboard oscillator provided with the Intel 80196 microcontroller, although a separate oscillator could be used.

In the preferred embodiment, drive frequency generator 16 is a tunable divide-by-n counter which divides the system clock signal down to a frequency usable by screen driver 20. Divisor value n is set by controller 14. The output or drive signal is a square wave with a frequency 1/n times as large as the system clock frequency. By varying divisor value n, the frequency of the drive signal is variable by about 50 KHz in one KHz steps up or down from a nominal center frequency of 110 KHz.

Alternatively, instead of employing a tunable divide-by-n counter, the drive frequency generator might be a phase-locked loop frequency synthesizer such as the Motorola MC145151-2. Such a frequency synthesizer could generate the drive signal directly and would be capable of producing much smaller frequency steps between adjacent frequency settings of the drive signal. The design and operation of such frequency synthesizers are known to one skilled in the art.

Bandpass filter 18 filters the square wave drive signal to derive a sine wave having the same frequency as the unfiltered drive signal. Bandpass filter 18 has sufficient bandwidth to pass the fundamental harmonic of the unfiltered drive signal and yet still block any undesirable secondary harmonics. Bandpass filter 18 is not absolutely necessary for proper operation; however, it does improve the signal-to-noise ratio at stylus 24, as well as reduce any electromagnetic radiation from write surface 22 which could be disruptive to nearby electrical equipment.

Screen driver 20 selectively applies the filtered drive signal to write surface 22 such that a linear voltage gradient is developed across write surface 22 in various directions. Controller 14 controls the polarity of the voltage gradients to screen driver 20 through control lines 36 and 37.

Write surface 22 includes a commercially available digitizer, which may include a glass substrate having a uniform resistive coating on one side. The resistive coating is selectively energized to produce a linear voltage gradient in various directions. A special highly conductive pattern along the periphery of this coating forms the electrodes necessary for energizing the digitizer.

Stylus 24 reads the potential of write surface 22 in the immediate proximity of stylus 24 via electrostatic coupling. This potential is proportional to stylus position along the voltage gradient across write surface 22. Stylus 24 is coupled to front end 30, which processes the stylus signal. Stylus 24 is also coupled to switch 26 which grounds the stylus periodically in response to a signal from controller 14.

Front end 30 couples to the output of stylus 24 and includes preamplifier 28, optional switch 29, bandpass filter 48, and AC-to-DC converter 50. Preamplifier 28 amplifies the stylus signal. Switch 29 is controlled by controller 14 and may be used to directly couple the amplified stylus output signal to screen driver 20 during tuning. Otherwise, the amplified stylus output signal is coupled to bandpass filter 48.

Bandpass filter 48 removes undesirable noise components from the amplified stylus signal by passing signals within a predetermined bandwidth centered around the drive signal frequency. Nominal bandpass filter center frequency in this embodiment is 110 KHz with a nominal bandwidth of 5 KHz.

Advantageously, bandpass filter 48 does not contain costly variable inductors or capacitors which require costly periodic manual adjustment, nor does it contain expensive high-precision components.

AC-to-DC converter 50 is coupled to bandpass filter 48. Conversion of the amplified and filtered stylus output signal may be accomplished in one of several equally preferred ways, including synchronous demodulation followed by low pass filtering, half-wave rectification followed by envelope detection, or half wave rectification followed by low pass filtering. All of these methods are known to one skilled in the art. The output signal of AC-to-DC converter 50 is a DC signal having a magnitude proportional to the peak-to-peak value of the output signal of bandpass filter 48.

Analog-to-digital (A/D) converter 32 converts the DC signal from AC-to-DC converter 50 to a digital value to be read by controller 14, which initiates A/D conversions.

Memory 34 is coupled to controller 14. In the preferred embodiment, memory 34 is a non-volatile random access memory (NVRAM) used for storing the optimal value of divisor value n.

Figure 2B:
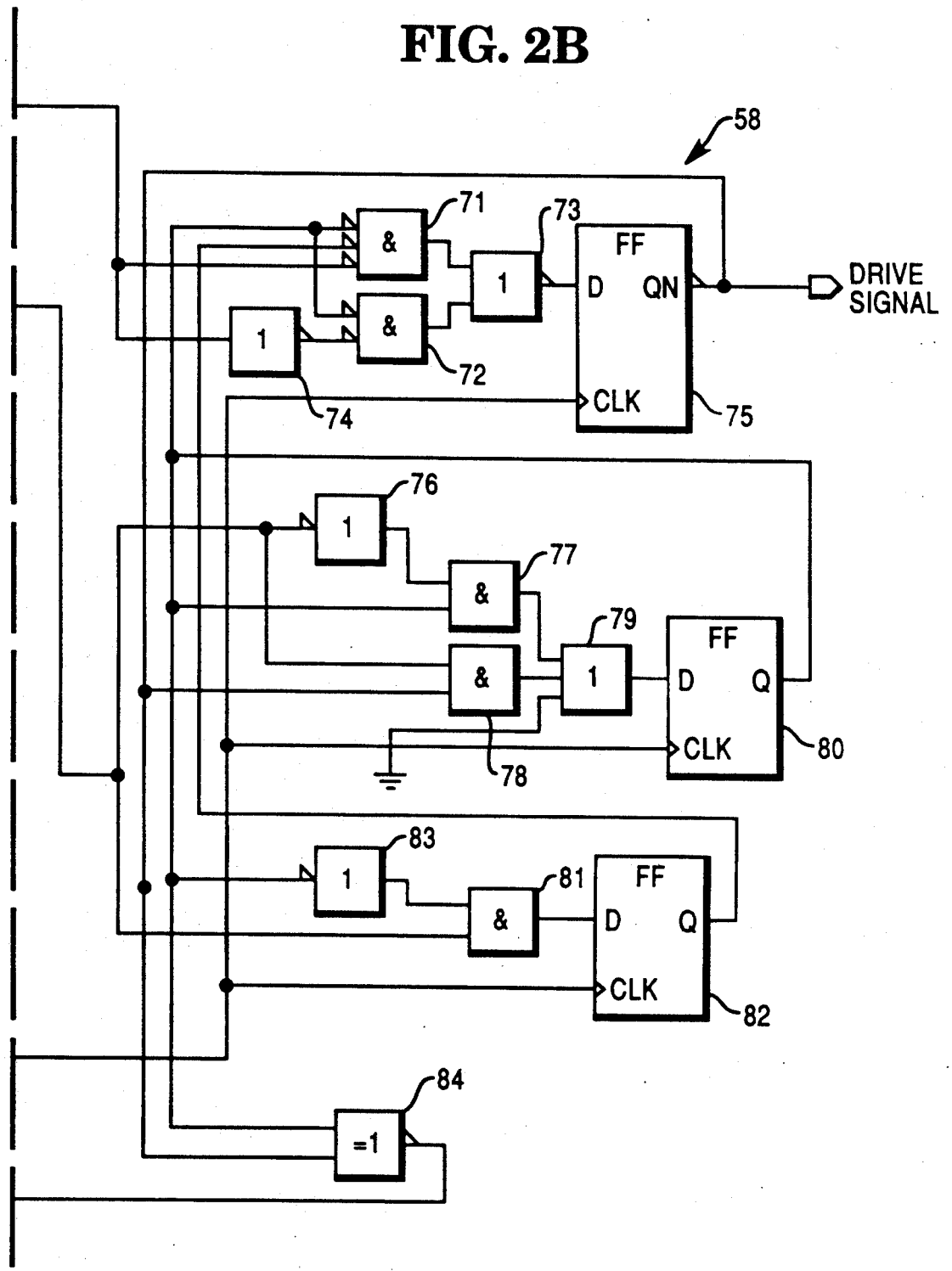
FIG. 2B is a continuation of the circuit diagram of FIG. 2A.

Referring now to FIGS. 2A and 2B, drive frequency generator 16 is shown in more detail. In the preferred embodiment, drive frequency generator 16 is a tunable divide-by-n counter, including commercially available 8-bit latch 54, 8-bit counter 56, and state machine 58. 8-bit latch 54 is coupled to controller 14 through latch enabling signal 60 and data bus 62.

Pins Q1-Q7 of latch 54 are coupled to commercially available 8-bit counter 56. Pin P7 of counter 56 represents the most significant bit and couples to voltage Vcc. Clock line 68 couples to the clock pins CLK.

State machine 58 includes commercially available logic elements 71 through 84, which in combination produce the drive signal as an output. State machine 58 couples to output LSB of latch 54 through pin Q0 and to output MSN_CARRY of counter 56 through pin C0. State machine 58 additionally receives the system clock signal from the clock line 68.

In more detail, logic element 73 couples to the outputs of logic elements 71 and 72. Preferably, logic elements 71-73 are NOR gates. Logic element 71 receives inputs from logic element 80, logic element 82, and the output of latch 54. Logic element 72 receives inputs from logic element 80 and logic element 74. Logic element 74 is an inverter coupled to the output of latch 54.

Logic element 79 couples to the outputs of logic elements 77 and 78 and to ground. Preferably, logic elements 77 and 78 are AND gates and logic element 79 is an OR gate. Logic element 77 receives inputs from logic element 76 and logic element 80. Logic element 76 is an inverter and is coupled to output MSN_CARRY of counter 56. Logic element 78 receives inputs from logic element 75 and output MSN_CARRY of counter 56.

Logic element 81 couples to the outputs of logic elements 80 and 83 and output MSN_CARRY of counter 56. Preferably, logic element 81 is an AND gate. Logic element 83 is an inverter and is coupled to the output of logic element 75.

Logic element 84 receives inputs from logic elements 75 and 80. Preferably, logic element 84 is an EX NOR (exclusive-NOR) gate. The output of logic element 84 is a load signal for counter 56.

Logic elements 75, 80, and 82 are commercially available flip-flops receiving inputs from clock bus 68. Logic element 75 couples to the output of logic element 73. The output of logic element 75 is the drive signal. Logic element 80 couples to the output of logic element 79 and logic element 82 couples to the output of logic element 81.

In operation, drive frequency generator 16 derives the minimum frequency step per count of divisor value n for a given system clock signal frequency and divides the system clock signal down in two stages. In the first stage, controller 14 parallel loads register value DRIVE_FREQ into latch 54 via a latch enabling signal 60 and data bus 62. Bits one through seven of register value DRIVE_FREQ are used as a reload value for 8-bit counter 56. Register value DRIVE_FREQ is equal to the quantity (259−n), where n is the desired divisor value. By reloading the seven most significant bits of register value DRIVE_FREQ into the seven least significant bits of 8-bit counter 56 and setting the most significant bit of the counter high, 8-bit counter 56 divides the system clock signal frequency by the integer remainder of the term (255-DRIVE_FREQ)/2.

In the second stage, state machine 58 divides the 8-bit counter output signal frequency by two, toggling the drive signal output and reloading 8-bit counter 56 every time state machine 58 sees a pulse at the output of 8-bit counter 56.

In order to make up for the least significant bit that was lost when the quantity (255-DRIVE_FREQ) was divided by two and truncated, state machine 58 holds off toggling the drive signal low for one extra count of the system clock signal. Thus, drive frequency generator 16 includes an extra system clock cycle during the on time of the output drive signal when the quantity (255-DRIVE_FREQ) is odd. The overhead in state machine 58 adds four extra counts per cycle of the drive signal.

There are two reasons for completing the division in two stages. First, the drive signal square wave must have a duty cycle as close as possible to 50% to avoid producing secondary harmonics close to the desired fundamental harmonic drive frequency which could leak through bandpass filter 18 and cause degraded digitizer operation and radiated emissions from write surface 22. Thus, the final divide-by-two stage is required to ensure a 50% duty cycle.

The second reason for the two-step division process is that the drive signal must have as small a frequency step as possible between adjacent settings of register value DRIVE_FREQ. The smaller the step, the closer the drive signal can be tuned to the center frequency of bandpass filter 48. Simply dividing the system clock frequency by register value DRIVE_FREQ would result in an excessively large step between adjacent settings of register value DRIVE_FREQ.

Increasing the system clock frequency would decrease the step between adjacent settings of register value DRIVE_FREQ, but this is not a viable option in many cases. Creating a higher system clock frequency would require a separate oscillator, which is cost prohibitive. Inserting an extra clock cycle in the final divide-by-two stage when register value DRIVE_FREQ is odd effectively doubles the frequency resolution to about 1 KHz, which is acceptable.

Figure 3:
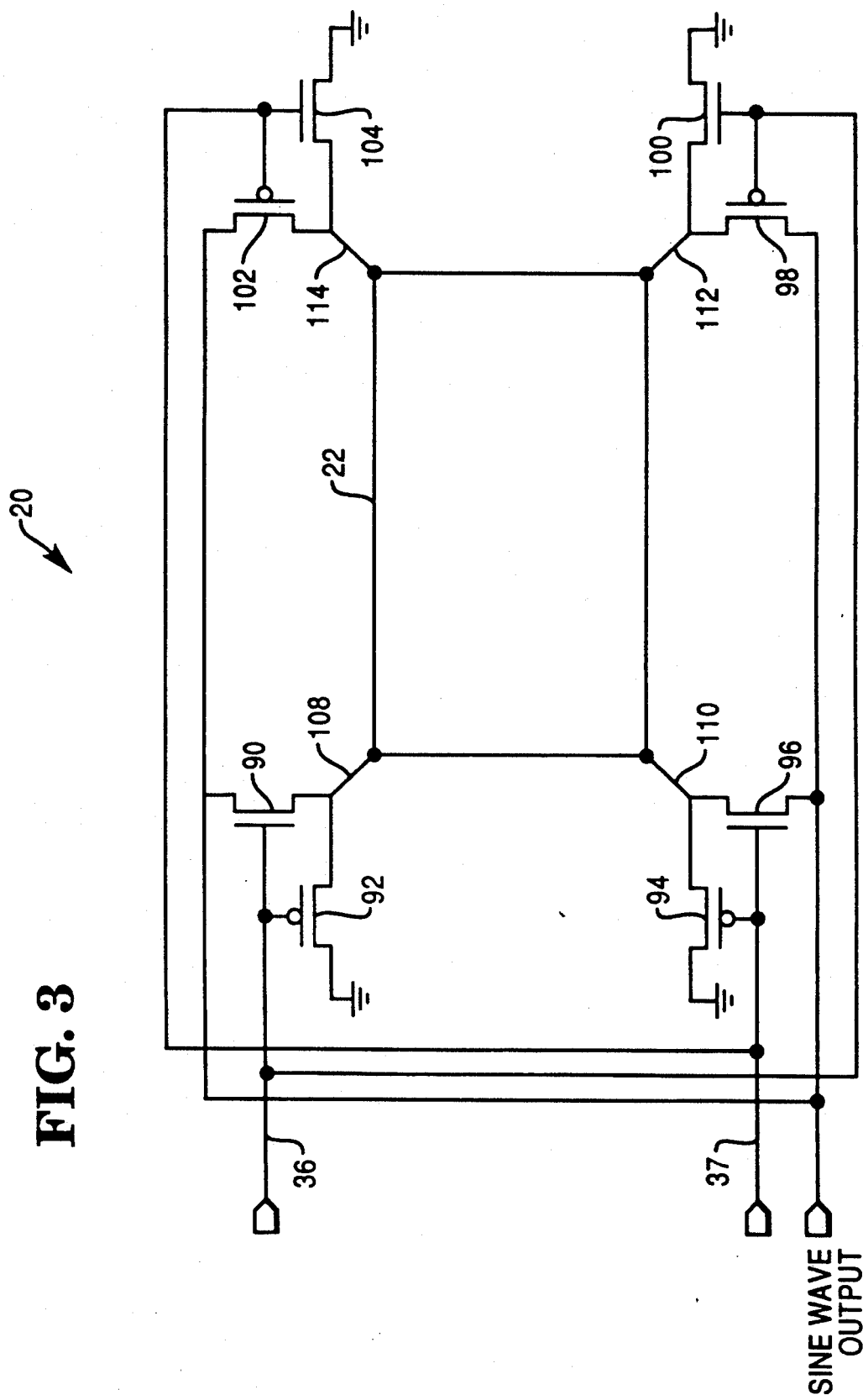
FIG. 3 is a circuit diagram of the screen driver of the present invention.

Referring now to FIG. 3, screen driver 20 is shown in more detail. Lines 36 and 37 control analog switches 90, 92, 94, 96, 98, 100, 102, and 104 to selectively apply the sine wave output of bandpass filter 18 to the corners of write surface 22. Lines 108, 110, 112, and 114 link the analog switches to write surface 22.

Figure 4:
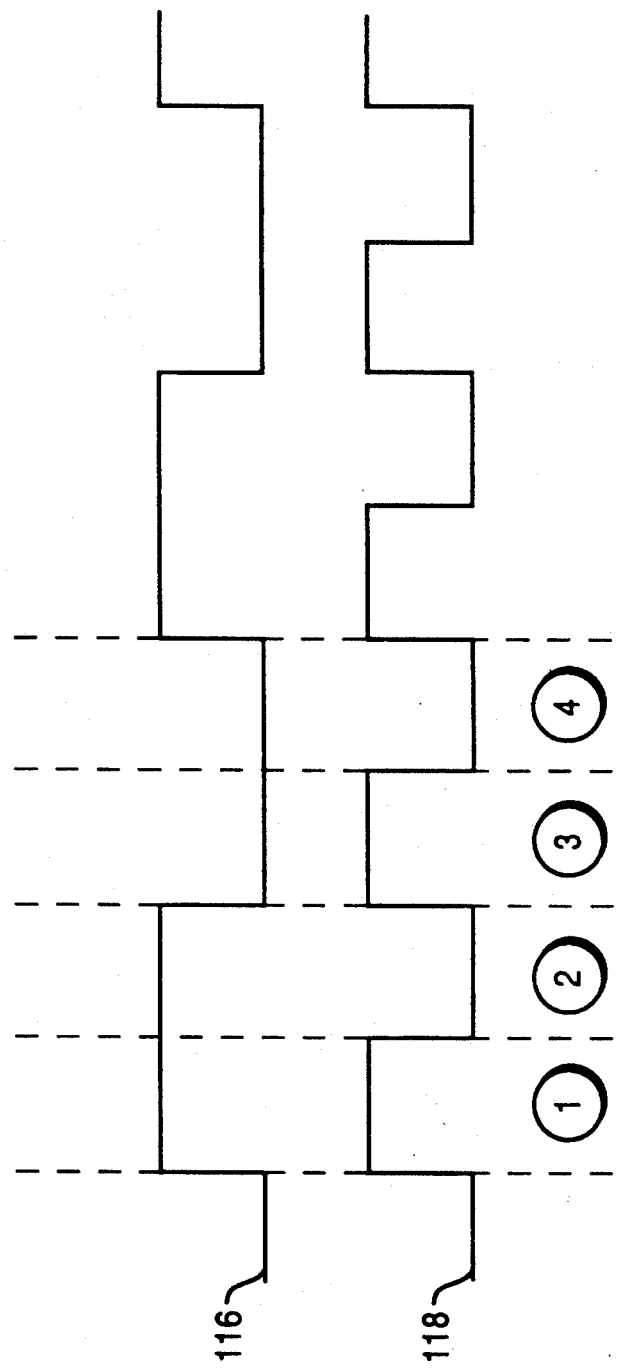
FIG. 4 is a pair of screen driver control waveforms.

Referring also to FIG. 4, control inputs 36 and 37 are shown as pulsed waveforms 116 and 118, waveform 116 over line 36 having a frequency half as large as waveform 118 over line 37. When control inputs 36 and 37 are low, switches 92, 94, 98, and 102 are "on" and switches 90, 96, 100, and 104 are "off". Opposite switch behavior occurs when control inputs 36 and 37 are high.

For example, low control input signals 36 and 37 apply the sine wave output from bandpass filter 18 to write surface 22 through lines 112 and 114 while grounding lines 108 and 110, thus creating an alternating voltage gradient along write surface 22 which increases from left to right. This gradient is called an x+direction voltage gradient and is shown as region four of FIG. 4.

Other combinations of control inputs 36 and 37 produce voltage gradients in other directions. Region one refers to an alternating voltage gradient increasing from right to left, which is called an x−direction voltage gradient. Region two refers to an alternating voltage gradient increasing from bottom to top, which is called a y+direction voltage gradient. Region three refers to an alternating voltage gradient increasing from top to bottom, which is called a y−direction voltage gradient.

Referring now to FIGS. 1-4, controller 14 determines stylus position on writing surface 22 as follows. First, controller 14 energizes write surface 22 in the x+direction and takes a corresponding reading, X+, from A/D converter 32. Controller 14 then energizes the screen in the x−direction and takes a corresponding reading, X−, from A/D converter 32. Controller 14 obtains a normalized (ratiometric) X-coordinate stylus location via the equation:

$$X = (X+ - X-)/(X- + X+) \qquad (Eq\ 1)$$

Controller 14 determines the Y-coordinate location in a similar fashion by applying the following equation:

$$Y = (Y+ - Y-)/(Y- + Y+) \qquad (Eq\ 2)$$

Controller 14 through switch 26 periodically grounds stylus 24 to measure an offset voltage caused by inherent imperfections in front end 30. Inherent imperfections in front end circuitry 30 will always introduce an unknown DC offset voltage. Controller 14 subtracts this measured offset voltage reading from all subsequent readings of A/D converter 32 to compensate for this DC offset voltage.

Figure 5:
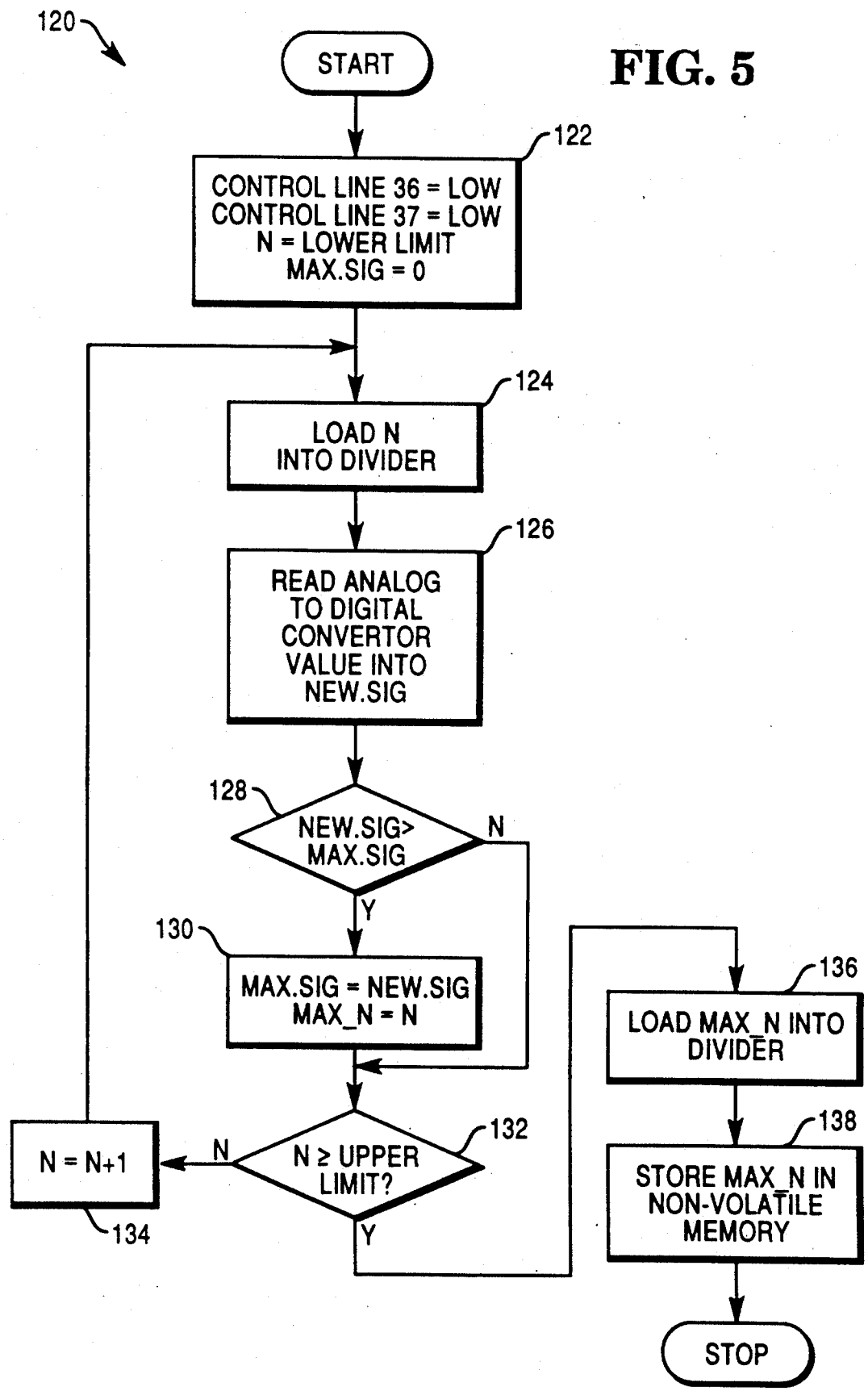
FIG. 5 is a flow diagram of the drive frequency tuning method of the present invention.

Turning now to FIG. 5, procedure 120 for determining the optimal value of divisor value n is shown. Procedure 120 is nominally performed whenever power is applied to circuit 10, but it need only be performed once at the time of manufacture. If an added margin of accuracy and reliability is desired, procedure 120 may be performed as often as desired.

During procedure 120, stylus 24 should be held still and in close proximity with write surface 22. The stylus output signal may be directly coupled to screen driver 20 via analog tuning switch 29 under the control of controller 14. Switch 29 is advantageous if procedure 120 is performed every time power is applied.

Procedure 120 begins in block 122 by initializing control signals 36 and 37 to low, divisor value n to LOWER LIMIT, and maximum output signal level MAX.SIG from bandpass filter 18 to zero. As described earlier, divisor value n equals (259-DRIVE_FREQ) where register value DRIVE_FREQ has a range of 0-255. Thus, the divisor value n has an effective range of 4 through 259. LOWER LIMIT in this embodiment is therefore equal to 4.

In block 124, divisor value n is loaded into drive frequency generator 16. In block 126, controller 14 reads the value at the output of A/D converter 32 into NEW.SIG. In block 128, controller 14 determines whether NEW.SIG is greater than MAX.SIG. If NEW.SIG is greater than MAX.SIG, MAX.SIG is set equal to NEW.SIG and MAX_N is set equal to n in block 130. If n is not greater than MAX.SIG, then block 130 is bypassed.

In either case, procedure 120 continues to block 132, where controller 14 determines whether n is greater than or equal to the constant UPPER LIMIT representing an upper limit for n. In this embodiment, UPPER LIMIT is equal to 259. If n is not greater than or equal to UPPER LIMIT, then procedure 120 continues to block 134, where n is incremented by one. From there, procedure 120 returns to block 124.

If in block 132 n is greater than or equal to UPPER LIMIT, then procedure 120 continues to block 136 where MAX_N is loaded into drive frequency generator 16. In block 138, MAX_N is then stored in NVRAM 34 for later recall and use by controller 14.

Although the invention has been described with particular reference to certain preferred embodiments thereof, variations and modifications of the present invention can be effected within the spirit and scope of the following claims.

What is claimed is:

1. A digitizer control circuit comprising:
   means for exciting the digitizer;
   means for sensing the excitation of the digitizer and for producing a signal having information about the position of the sensing means; and
   means, coupled to the sensing means, for processing the information signal having a frequency characteristic which changes;
   said exciting means being tunable to the processing means as the frequency characteristic changes.

2. The digitizer control circuit as recited in claim 1, further comprising means for controlling the exciting means and for determining the position of the sensing means from the information signal.

3. The digitizer control circuit as recited in claim 2, wherein the processing means comprises means for filtering the information signal.

4. The digitizer control circuit as recited in claim 2, further comprising means for grounding the sensing means to allow the controlling means to measure a direct voltage bias.

5. The digitizer control circuit as recited in claim 1, wherein the exciting means comprises a variable frequency generator.

6. The digitizer control circuit as recited in claim 2, wherein the exciting means comprises:
   a tunable divide-by-n circuit; and
   a clock coupled to the tunable divide-by-n circuit through the controlling means for driving the tunable divide-by-n circuit.

7. The digitizer control circuit as recited in claim 6, further comprising memory means, coupled to the controlling means, for storing an optimal value of n.

8. The digitizer control circuit as recited in claim 7 wherein the memory means comprises a nonvolatile memory.

9. The digitizer control circuit as recited in claim 6, wherein the exciting means further comprises:
   a bandpass filter coupled to the output of the tunable divide-by-n counter; and
   driver means, coupled to the output of the bandpass filter and controlled by the controlling means, for selectively applying the excitation signal to the digitizer.

10. The digitizer control circuit as recited in claim 9, further comprising switch means, controlled by the controlling means, for coupling the output of the sensing means to the input of the driver means during tuning of the tunable divide-by-n counter.

11. The digitizer control circuit as recited in claim 1, wherein the sensing means comprises a stylus.

12. The digitizer control circuit as recited in claim 3, wherein the filtering means comprises:
   a bandpass filter having a predetermined bandwidth and center frequency.

13. The digitizer control circuit as recited in claim 12, wherein the bandpass filter has a bandwidth narrow enough to minimize transmission of extraneous electrical noise from the sensing means to the processing means.

14. The digitizer control circuit as recited in claim 3, wherein the processing means further comprises:
a preamplifier coupled between the sensing means and the filtering means;
an AC-to-DC converter coupled to the output of the filtering means; and
an analog-to-digital converter coupled to the output of the AC-to-DC converter.

15. The digitizer control circuit as recited in claim 2, wherein the controlling and determining means comprises a controller.

16. The digitizer control circuit as recited in claim 6, wherein the tunable divide-by-n counter comprises:
an 8-bit latch, coupled to the controlling means, for storing an 8-bit register value related to the divisor value n;
an 8-bit counter, coupled to the seven most significant bits of the 8-bit latch and to the clock output of the controlling means, for producing a first quotient output; and
a state machine, coupled to the least significant bit of the 8-bit latch, the first quotient output of the 8-bit counter, and the clock output of the controlling means, for producing a second quotient output related to the excitation signal and for producing an output for reloading the 8-bit counter.

17. A digitizer control circuit comprising:
means for tunably exciting the digitizer including a tunable divide-by-n circuit, a clock for driving the tunable divide-by-n circuit, a first bandpass filter coupled to the output of the tunable divide-by-n counter, and means coupled to the output of the first bandpass filter for selectively applying the excitation signal to the digitizer;
means for sensing the excitation of the digitizer and for producing a signal having information about the position of the sensing means, including a stylus;
means for controlling the exciting means and for determining the position of the sensing means from the information signal, including a controller;
means, coupled to the controlling means, for processing the information signal including a preamplifier coupled to the sensing means, a second bandpass filter coupled to the output of the preamplifier having a predetermined bandwidth narrow enough to minimize transmission of extraneous electrical noise from the sensing means, an AC-to-DC converter coupled to the output of the second bandpass filter, and an analog-to-digital converter coupled to the output of the AC-to-DC converter;
means for grounding the sensing means to allow the controlling means to measure a direct voltage bias; and
non-volatile memory means, coupled to the controlling means, for storing the most recent value of n.

18. A tunable divide-by-n circuit comprising:
an 8-bit latch for storing an 8-bit register value related to the divisor value n;
an 8-bit counter, coupled to the seven most significant bits of the 8-bit latch and to a clock, for producing a first quotient output; and
a state machine, coupled to the least significant bit of the 8-bit latch, the first quotient output of the 8-bit counter, and the clock, for producing a second quotient output and an output for reloading the 8-bit counter.

19. A method for controlling a digitizer having an active surface comprising:
producing an excitation signal for exciting the digitizer;
exciting the digitizer with the excitation signal;
sensing the excitation of the digitizer at a point on the active surface of the digitizer;
producing a position signal having information about the location of the point on the active surface of the digitizer;
processing the position signal, including the substep of filtering the position signal, about a filter frequency which changes, enough to minimize transmission of extraneous electrical noise; and
tuning the excitation signal to the filter frequency as it changes.

20. The method as recited in claim 19, wherein the step of producing an excitation signal comprises the substeps of:
producing a first frequency signal; and
dividing the first frequency signal by a divisor value within a predetermined range of divisor values.

21. The method as recited in claim 20, wherein the step of tuning comprises the substeps of:
comparing a current level of the position signal with a previous level; and
changing the frequency of the excitation signal if the current level is greater than the previous level.

22. The method as recited in claim 21, wherein the step of changing comprises the substep of decreasing the excitation frequency from a predetermined maximum frequency, including the steps of:
increasing the divisor value for each comparison of the current level and the previous level from a minimum divisor value to a maximum divisor value;
dividing the first frequency signal by a tuning divisor value corresponding to a maximum position signal level; and
storing the tuning divisor value.

23. A digitizer control circuit comprising:
means for exciting the digitizer;
means for sensing the excitation of the digitizer and for producing a signal having information about the position of the sensing means;
means, coupled to the sensing means, for processing the information signal;
means for controlling the exciting means and for determining the position of the sensing means from the information signal; and
means for grounding the sensing means to allow the controlling means to measure a direct voltage bias;
said exciting means being tunable to the processing means.

24. A digitizer control circuit comprising:
means for exciting the digitizer, including a variable frequency generator;
means for sensing the excitation of the digitizer and for producing a signal having information about the position of the sensing means; and
means, coupled to the sensing means, for processing the information signal having a frequency characteristic which changes;
said exciting means being tunable to the processing means as the frequency characteristic changes.

25. A digitizer control circuit comprising:

means for exciting the digitizer, including a tunable divide-by-n circuit, and a clock coupled to the tunable divide-by-n circuit through the controlling means for driving the tunable divide-by-n circuit;

means for sensing the excitation of the digitizer and for producing a signal having information about the position of the sensing means;

means, coupled to the sensing means, for processing the information signal; and means for controlling the exciting means and for determining the position of the sensing means from the information signal;

said exciting means being tunable to the processing means.

26. The digitizer control circuit as recited in claim 25, further comprising memory means, coupled to the controlling means, for storing an optimal value of n.

27. The digitizer control circuit as recited in claim 26, wherein the memory means comprises a nonvolatile memory.

28. The digitizer control circuit as recited in claim 25, wherein the exciting means further comprises:

a bandpass filter coupled to the output of the tunable divide-by-n counter; and means, coupled to the output of the bandpass filter and controlled by the controlling means, for selectively applying the excitation signal to the digitizer.

29. The digitizer control circuit as recited in claim 25, wherein the tunable divide-by-n circuit comprises:

an 8-bit latch, coupled to the controlling means, for storing an 8-bit register value related to the divisor value n;

an 8-bit counter, coupled to the seven most significant bits of the 8-bit latch and to the clock output of the controlling means, for producing a first quotient output; and a state machine, coupled to the least significant bit of the 8-bit latch, the first quotient output of the 8-bit counter, and the clock output of the controlling means, for producing a second quotient output related to the excitation signal and for producing an output for reloading the 8-bit counter.

30. A method for controlling a digitizer having an active surface comprising:

producing an excitation signal for exciting the digitizer;

exciting the digitizer with the excitation signal, including the substeps of producing a first frequency signal, and dividing the first frequency signal by a divisor value within a predetermined range of divisor values;

sensing the excitation of the digitizer at a point on the active surface of the digitizer;

producing a position signal having information about the location of the point on the active surface of the digitizer;

processing the position signal, including the substep of filtering the position signal enough to minimize transmission of extraneous electrical noise; and tuning the excitation signal, including the substeps of comparing a current level of the position signal with a previous level, and changing the frequency of the excitation signal if the current level is greater than the previous level.

31. The method as recited in claim 30, wherein the substep of changing comprises the substep of decreasing the excitation frequency from a predetermined maximum frequency, including the substeps of:

increasing the divisor value for each comparison of the current level and the previous level from a minimum divisor value to a maximum divisor value;

dividing the first frequency signal by a tuning divisor value corresponding to a maximum position signal level; and storing the tuning divisor value.

* * * * *